United States Patent [19]

Chen

[11] Patent Number: 5,558,166
[45] Date of Patent: Sep. 24, 1996

[54] POWER TOOL

[76] Inventor: Ching-Jen Chen, No. 71, Mei-Ning St., Tai-Shan Shieng, Taipei Hsien, Taiwan

[21] Appl. No.: 430,239

[22] Filed: Apr. 28, 1995

[51] Int. Cl.$^6$ ................................... H02G 1/12
[52] U.S. Cl. .................. 173/49; 173/216; 81/9.4; 74/118
[58] Field of Search .................. 173/216, 49; 227/120, 227/131; 81/9.4, 9.51, 9.42, 9.44; 74/118, 116

[56] References Cited

U.S. PATENT DOCUMENTS

| | | | |
|---|---|---|---|
| 4,726,505 | 2/1988 | Okazaki | 227/131 |
| 5,029,745 | 7/1991 | Akizawa et al. | 227/131 |
| 5,195,671 | 3/1993 | Shimomura et al. | 227/120 |
| 5,346,114 | 9/1994 | Udagawa et al. | 227/120 |
| 5,460,313 | 10/1995 | Magnasson et al. | 227/131 |
| 5,474,222 | 12/1995 | Kanai et al. | 227/131 |

*Primary Examiner*—Scott A. Smith
*Attorney, Agent, or Firm*—Bacon & Thomas

[57] ABSTRACT

A power tool including a machine base, a fixed jaw fixedly secured to the machine base, a movable jaw turned about a pivot on the fixed jaw, a spring supported between the fixed jaw and the movable jaw to force the movable jaw into the closed position on the fixed jaw, a motor mounted within the machine base, a speed reducer, an eccentric shaft coupled to the motor through the speed reducer, and a link reciprocated by the eccentric shaft to turn the movable jaw about the pivot, causing the movable jaw to act against the fixed jaw in processing the workpiece put between the movable jaw and the fixed jaw.

2 Claims, 5 Drawing Sheets

POWER TOOL

BACKGROUND OF THE INVENTION

The present invention relates to tools, and relates more particularly to a power tool for crimping or cutting things.

A variety of hand tools, such as wire strippers, wire crimpers, cutting pliers, multipurpose tools, etc., have been disclosed, and have appeared on the market. Because these hand tools are commonly operated by hand, it needs much effort to operate the tools. The operator will get tired quickly when using these hand tools to process a big quantity of workpieces. Furthermore, it is difficult to control the quality of the workpieces when the workpieces are processed by hand.

SUMMARY OF THE INVENTION

The present invention has been accomplished under the circumstances in view. According to the preferred embodiment of the present invention, a motor drive is installed to turn the movable jaw about the pivot on the fixed jaw through a transmission mechanism, which is comprised of a speed reducer, an eccentric shaft turned by the motor drive through the speed reducer, and a link coupled between the eccentric shaft and the movable jaw and reciprocated by the eccentric shaft to turn the movable jaw about the pivot.

DETAILED DESCRIPTION OF THE PREFERRED EMBODIMENT

Figure 1:
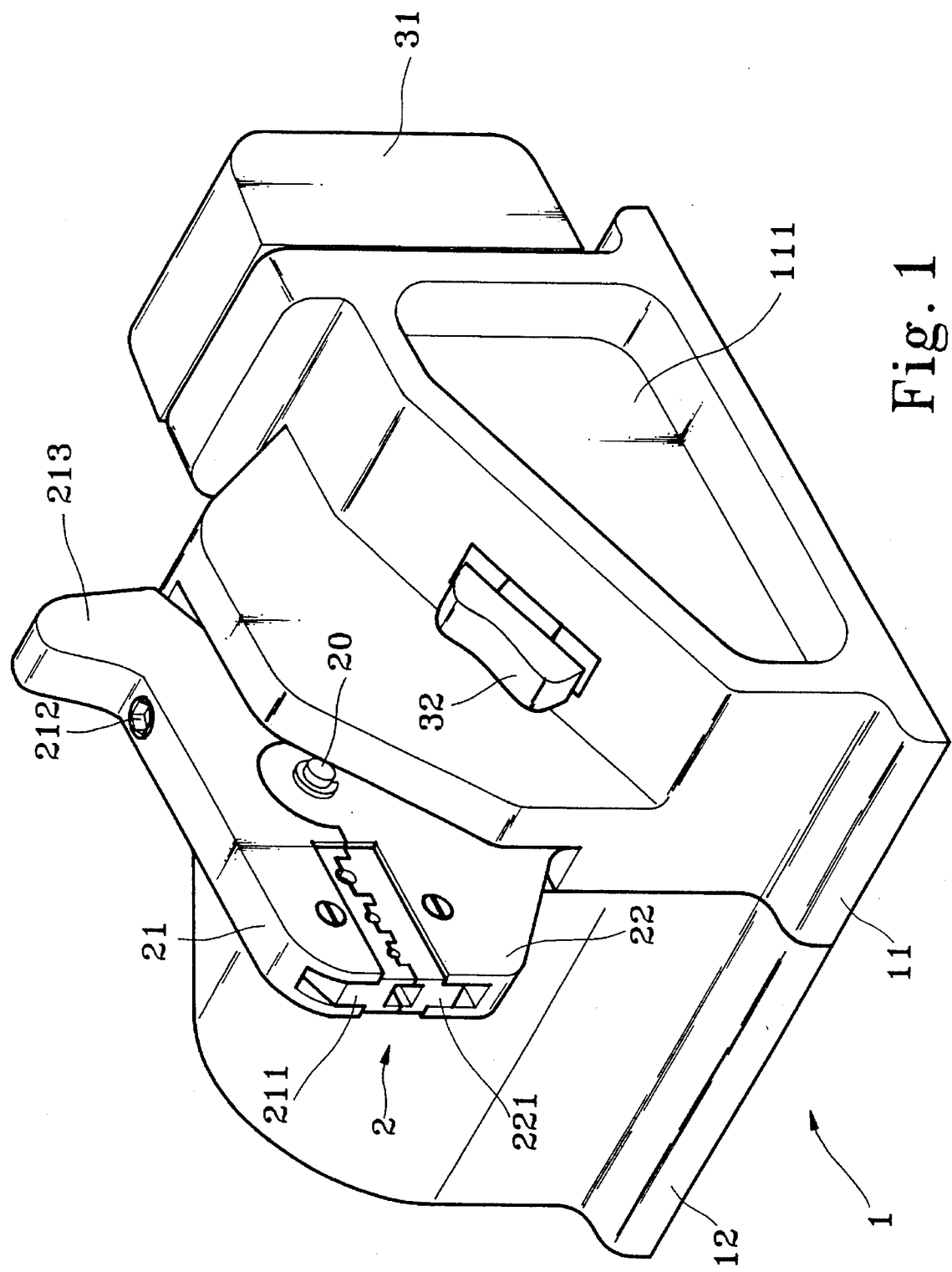
FIG. 1 is an elevational view of a power tool according to the present invention.

Referring to FIG. 1, the machine base, referenced by 1, has a flat bottom side for supporting on the top of a table, comprised of a first base frame 11 and a second base frame 12 abutted against each other. A signal line crimper 2 is fastened to the machine base 1 between the first base frame 11 and the second base frame 12. The signal line crimper 2 comprises a fixed jaw 22 fixedly secured to the machine base 1, and a movable jaw 21 turned bout a pivot 20 on the fixed jaw 22. The movable jaw 21 has a back flange 213 supported on a spring 23 (see FIG. 2). The spring 23 forces the signal line crimper 2 constantly closed. Two crimping plates 211 and 221 are respectively and detachably fastened to the movable jaw 21 and the fixed jaw 22 by screws and acted against each other when the movable jaw 21 is moved relative to the fixed jaw 22. Wire stripping or cutting plates may be installed to replace the crimping plates 211 and 221 for stripping or cutting wires. An adjustment screw 212 is mounted on the movable jaw 21 to adjust the clamping tightness of the crimper 2. A hand-hold 111 is made on the first base frame 11 at one side, so that the power tool can be conveniently carried by hand. A battery power supply 31 is mounted on the first base frame 11 at the back side to provide power supply to the internal motor drive (this will be described further). A power switch 32 is mounted on the first base frame 11 at the top side for controlling power supply from the battery power supply 31 to the motor drive. The crimping plate 211 of the movable jaw 21 can be moved away from the crimping plate 221 of the fixed jaw 22 by turning the back flange 213. When the workpiece is loaded, the back flange 213 is released from the hand, and the crimping plate 211 is forced back by the spring 23 to hold down the workpiece on the crimping plate 22i of the fixed jaw 21. When the power switch 32 is switched on, the movable jaw is driven to turn about the pivot 20, causing the workpiece crimped by the crimping plates 211 and 221.

Figure 2:
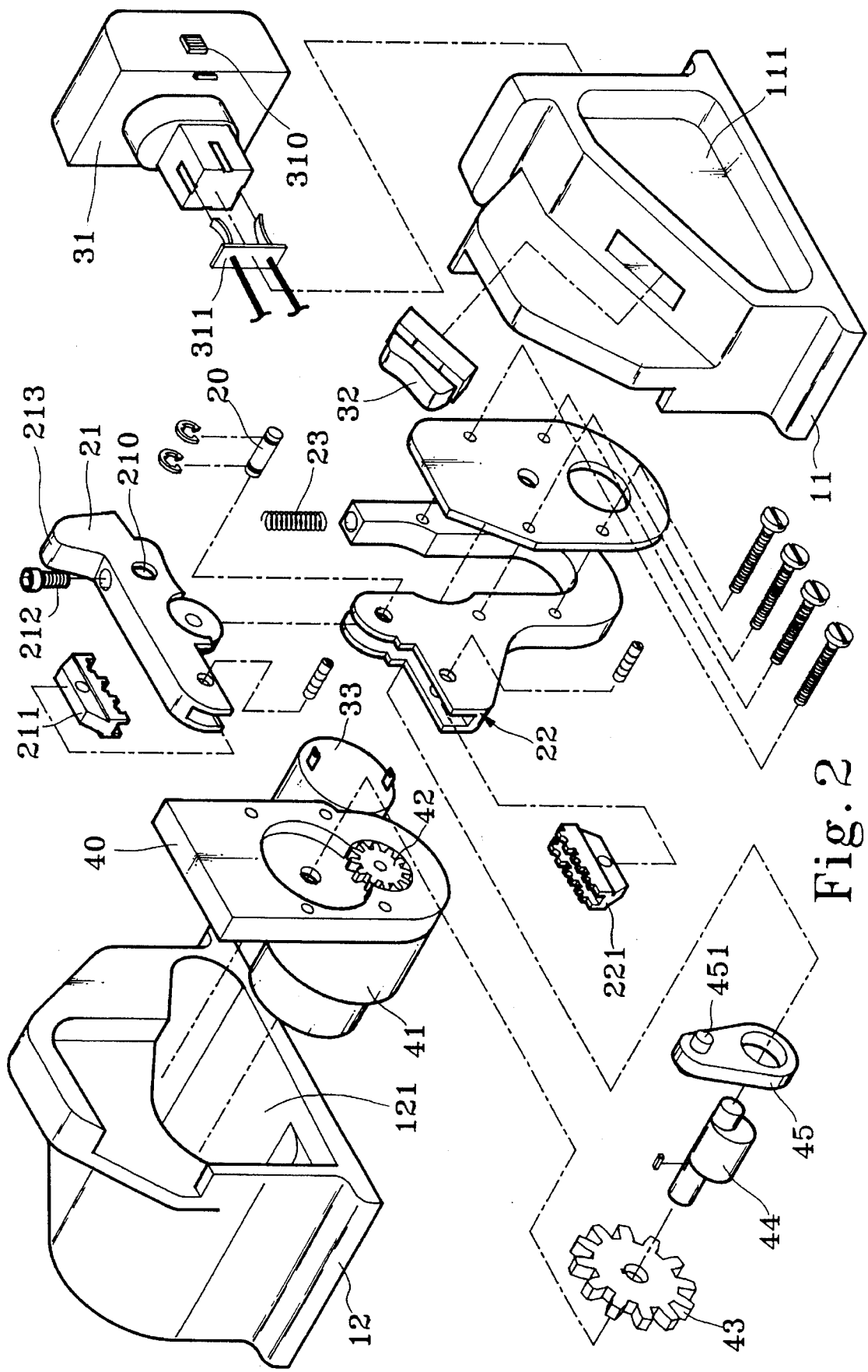
FIG. 2 is an exploded view of the power tool shown in FIG. 1.

Referring to FIG. 2, the aforesaid motor drive comprises a mount 40 mounted in a chamber 121 on the second base frame 12, a motor 33 mounted on the mount 40, a link 45, an eccentric shaft 44, and a speed reducer 41 mounted on the mount 40 and driven by the motor 33 to move the link 45 through the eccentric shaft 44. The chamber 121 has one end covered with a heat sink (not shown). The speed reducer 41 comprises a drive gear 42, a driven gear 43 fixedly mounted around the eccentric shaft 44 and meshed with the drive gear 42. The link 45 has one end coupled to the eccentric shaft 44 by a loose coupling and an opposite end made with a round pin 451 fitted into a coupling hole hole 210 at one end of the movable jaw 21. Therefore, when the link 45 is moved by the eccentric shaft 44, the movable jaw 21 is driven by the link 45 and turned about the pivot 20. The movable jaw 21 is pivotably connected to the fixed jaw 22 by the pivot 20 and spring washers. The aforesaid spring 23 has a bottom end connected to the fixed jaw 22 and a top end connected to the movable jaw 21. Therefore, the spring 23 gives an upward pressure to the rear end of the movable jaw 21, causing the crimper 2 normally closed. The crimping plates 211 and 221 are respectively fastened to the movable jaw 21 and the fixed jaw 22 by screws, therefore they are replaceable. The fixed jaw 22 is fixed to the mount 40 by screws. The movable jaw 21 protrudes over the top side of the second base frame 12. When the first base frame 11 and the second base frame 12 are connected together, the aforesaid motor drive is received inside the machine base 1. The battery power supply 31 has a coupling portion 310 fastened to a respective coupling portion (not shown) on the first base frame 11. The power output of the battery power supply 31 is connected to an electric connector 311, which is connected to the power input of the motor 33 through the power switch 32.

Figure 3:
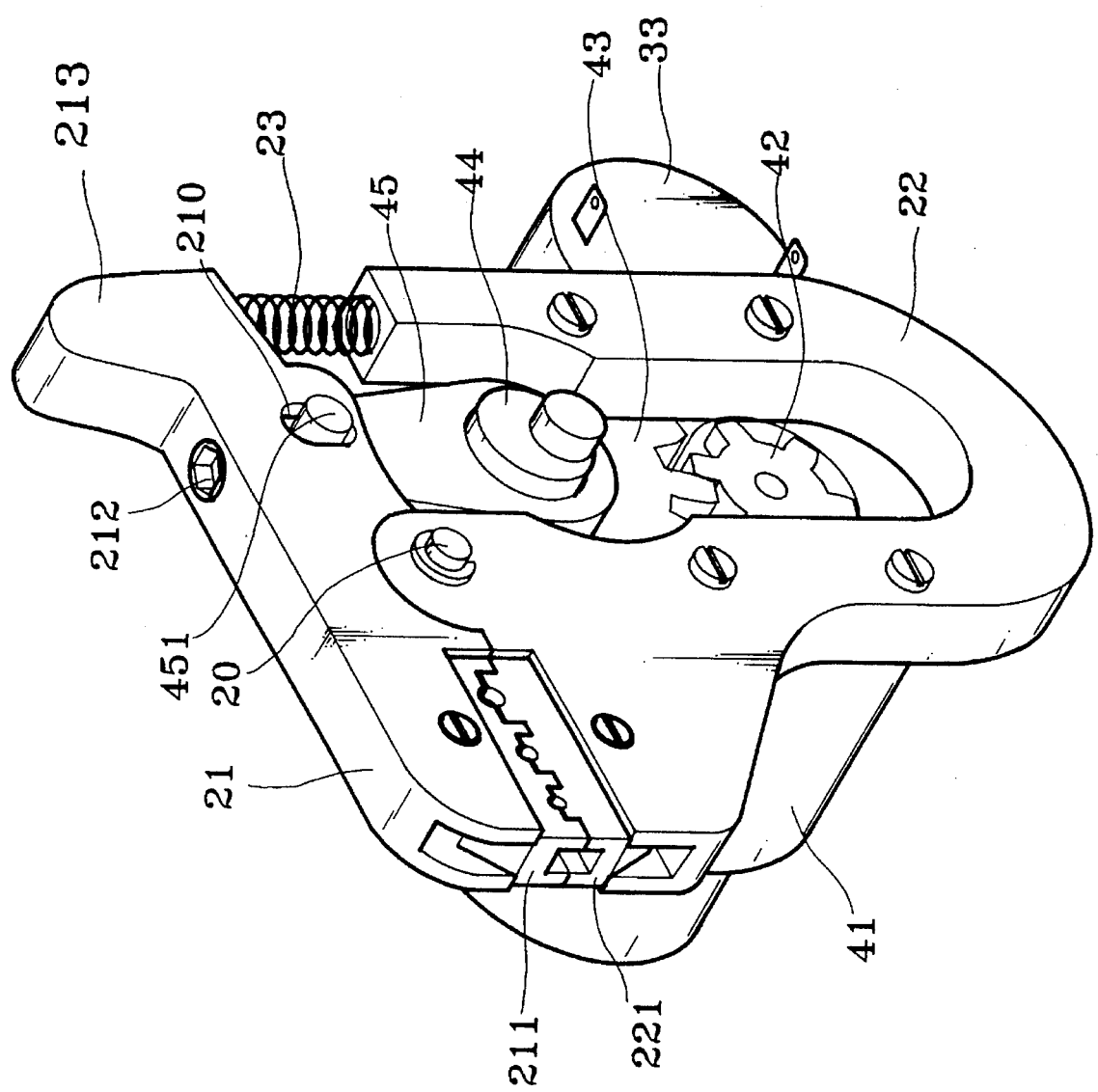
FIG. 3 is an assembly view of the motor drive and the crimper for the power tool according to the present invention.

FIG. 3 is an assembly view of the aforesaid motor drive and the aforesaid crimper 2. As illustrated, the round pin 451 of the link 45 is inserted into the coupling hole 210 on the movable jaw 21. The coupling hole 210 is an oblong hole, therefore the round pin 451 of the link 45 can be moved in the oblong hole when the adjustment screw 212 is turned to adjust the tightness of the crimper 2.

Figure 5:
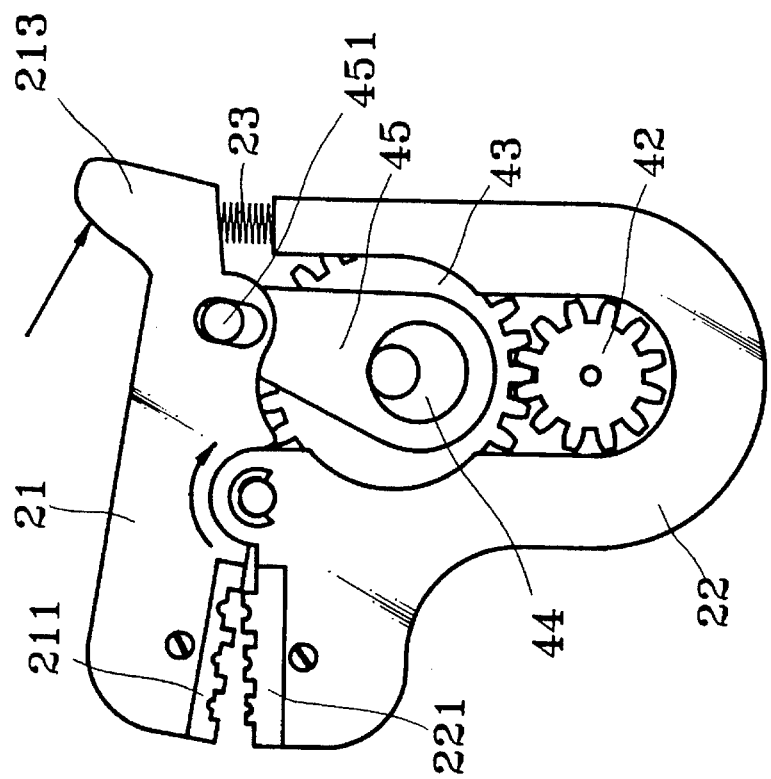
FIG. 5 is similar to FIG. 3 but showing the movable jaw lifted from the fixed jaw.
Figure 4:
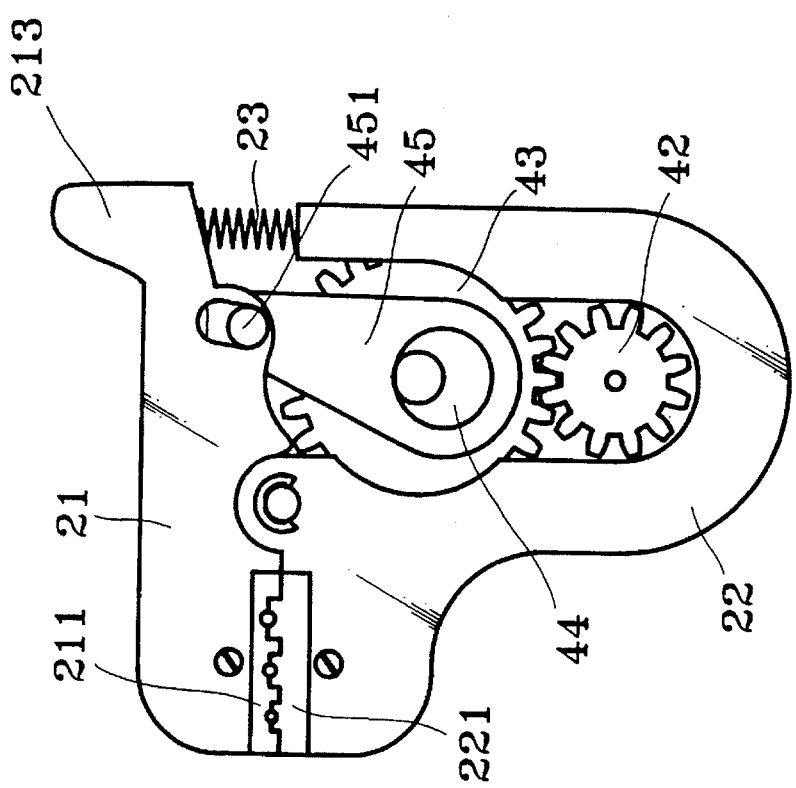
FIG. 4 is a side view of FIG. 3, showing the crimper closed.
Figure 7:
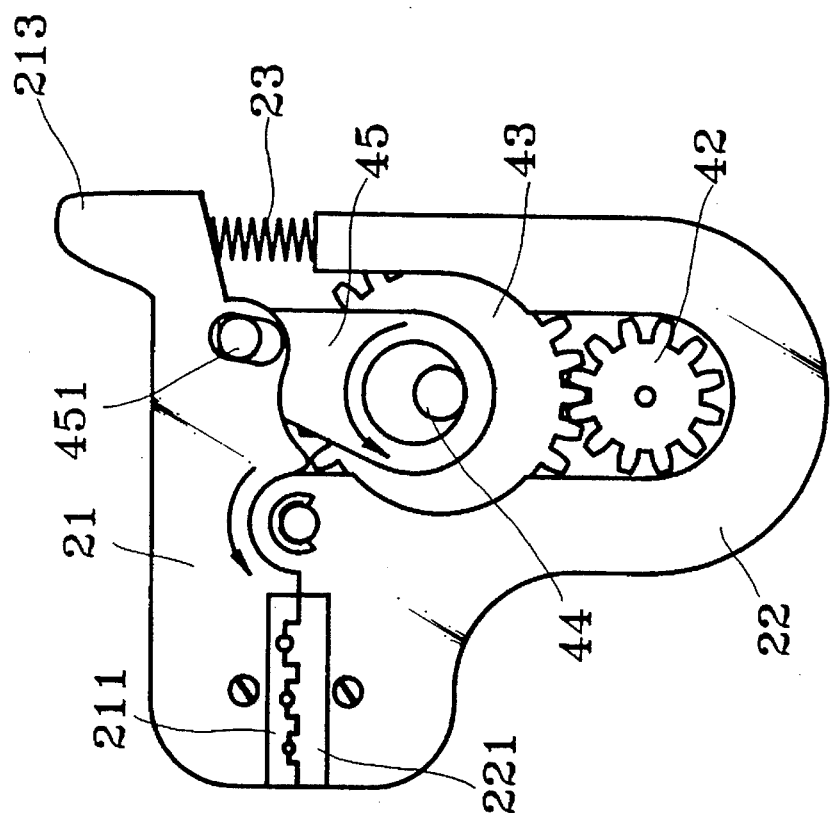
FIG. 7 is similar to FIG. 3 but showing the round pin of the link moved to the upper limit in the oblong coupling hole on the movable jaw.
Figure 6:
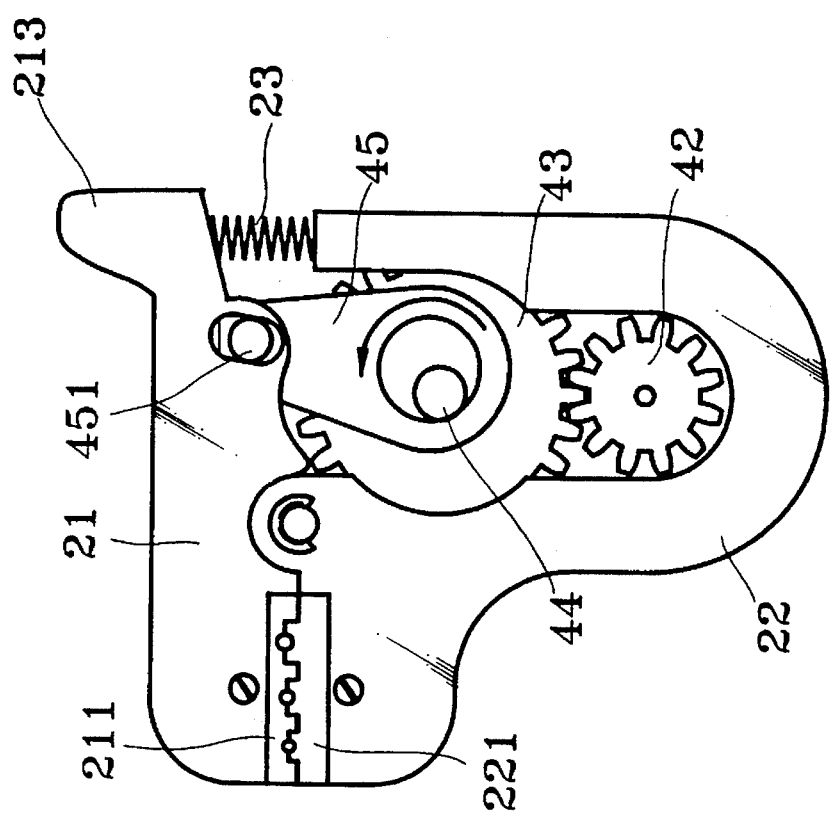
FIG. 6 is similar to FIG. 3 but showing the link reciprocated.

The operation of the power tool is outlined hereinafter with reference to Figures from 4 to 7. When the power tool is not operated, the crimping plates 211 and 221 are closed (see FIG. 4). When the back flange 213 is turned backwards, the crimping plate 211 of the movable jaw 21 is lifted from the crimping plate 221 of the fixed jaw 22 for allowing the workpiece to be put in between the crimping plates 211 and 221 (see FIG. 5). When the workpiece is put in between the crimping plates 211 and 221, the back flange 213 is released from the hand, then the motor drive is operated to move the link 45 (see FIG. 6). When the round pin 451 of the link 45 is moved to the upper limit in the oblong coupling hole 210, the crimping plate 211 of the movable jaw 21 is forced downwards against the workpiece, causing the workpiece crimped (see FIG. 7). When the motor drive keeps operating, the round pin 451 of the link 45 is moved from the upper limit to the lower limit to release pressure from the movable jaw 21, therefore the movable jaw 21 can then be turned to lift its crimping plate 211 from the crimping plate 221 of the fixed jaw 22, permitting the processed workpiece to be removed from the crimper 2.

It is to be understood that the drawings are designed for purposes of illustration only, and are not intended as a definition of the limits and scope of the invention disclosed.

I claim:

1. A power tool comprising:

a machine base;

a fixed jaw fixedly secured to said machine base, said fixed jaw having a pivot in a middle portion and a working plate at a front end thereof;

a movable jaw turned about the pivot on said fixed jaw and drive to act with said fixed jaw in processing a workpiece between, said movable jaw having a working plate disposed at a front end thereof and moved to act against the working plate on said fixed jaw in processing the workpiece, an oblong hole vertically disposed near a rear end thereof;

a motor mounted inside said machine base;

a power supply unit to provide electric power supply to said motor;

a transmission mechanism driven by said motor to turn said movable jaw about said pivot relative to said fixed jaw in processing the workpiece, said transmission mechanism comprising a speed reducer, a drive gear turned by said speed reducer, an eccentric shaft, a driven gear fixedly mounted around said eccentric shaft and meshed with said drive gear, a link having one end coupled to said eccentric shaft by a loose coupling and an opposite end fixedly made with a round pin inserted in the oblong hole on said movable jaw, the round pin of said link being reciprocated in the oblong hole on said movable jaw to turn said movable jaw about said pivot when said eccentric shaft is turned by said motor through said speed reducer and said drive gear via said driven gear.

2. The power tool of claim 1 further comprising a spring supported between said movable jaw and said fixed jaw to give a pressure to said movable jaw, causing said movable jaw to be closed on said fixed jaw.

* * * * *